Patented Feb. 15, 1944

2,342,075

UNITED STATES PATENT OFFICE 2,342,075

BLEACHING PROCESS

Charles G. Ferrari, Minneapolis, and Willis S. Hutchinson, St. Paul, Minn., assignors to General Mills, Inc., a corporation of Delaware No Drawing. Application June 12, 1943, Serial No. 490,684

3 Claims. (Cl. 99—232)

The present invention relates to the improvement of wheat flour and other edible finely divided milled products, including the color, baking, and keeping qualities thereof and more particularly has reference to processes for the bleaching and aging or maturing of flour and the like.

This application is a continuation-in-part of our co-pending application Serial Number 352,910, filed August 16, 1940.

The principal object of our invention is to provide a process for the production of a bleached flour of excellent color without either adversely affecting its baking properties or its keeping qualities.

Another object of our invention is to provide a bleaching process for flour and the like in which smaller quantities of bleaching agents are required for the bleaching and maturing operation than would be required according to the usual commercial bleaching methods.

A further object of our invention is to provide a bleaching process for flour and the like which will enable baked goods of greater volume to be produced from the flour bleached by our process than would be produced from flour bleached by conventional bleaching methods.

A still further object of our invention is to provide a process for the multiple bleaching and maturing of wheat flour and other edible finely divided milled products which comprises exposing flour or other finely divided milled cereal products while agitated in a finely divided state to the action of a gaseous bleaching agent for a sufficient length of time and at a sufficient partial pressure of the gas to at least partially bleach the flour or other finely divided milled cereal product and then exposing the flour or other finely divided milled cereal product while agitated in a finely divided state to the action of a second gaseous bleaching agent of a different nature than that used in the first bleaching operation, for a sufficient length of time and at a sufficient partial pressure of the gas to complete the bleaching and maturing of the flour or other edible finely divided milled cereal product.

These and other objects, as will hereinafter appear, will be apparent from the following description of the invention. Our invention is based on the discovery that improved bleaching or bleaching and maturing results may be obtained at a materially reduced cost by employing gaseous bleaching agents in a preferential order of application. Broadly, the process comprises contacting the flour or other finely divided milled cereal products, while agitated in a finely divided state, with a quantity of gaseous chlorine, for a sufficient length of time and at a sufficient partial pressure to at least partially bleach or bleach and mature the product, and then contacting the product with a quantity of vaporized nitric acid for a sufficient length of time and at a sufficient partial pressure to complete the bleaching or bleaching and maturing of the product. It has been found that the application of the bleaching agents in this order produces decidedly better results than when they are applied in the reverse order. This will be more fully apparent from the following more detailed description of the process.

In carrying out our invention, we prefer to employ apparatus of the type illustrated in our co-pending application referred to above. Such apparatus is composed of two separate chambers each equipped with an agitator and inlet and outlet means for the flour and the bleaching gas. In this way it is possible to isolate the treatment in one zone from the treatment in the second zone.

Patent flour, while being vigorously agitated, was contacted with 21.3 grams of chlorine per barrel of flour, the chlorine being at a low partial pressure in the chlorine and air mixture. This flour was subsequently contacted while similarly agitated with 2.1 grams of nitric acid per barrel of flour. The nitric acid was in a gaseous form at a low partial pressure of the nitric acid in air. It was obtained by bubbling air through concentrated (70%) nitric acid. The treated flour was found to have a flour pigment content expressed as "carotene" of 0.74 part per million, whereas the same flour identically treated, with the exception that the bleaching agents were applied in the reverse order, had a "carotene" content of 0.92 part per million.

Bread baked from these flours also demonstrated the efficacy of the preferred bleaching treatment. The following table sets forth some of the characteristics of the loaves:

| Bleaching treatment | Pigment as "carotene" P.p.m. | Loaf volume | Crumb color | Crumb grain |
|---|---|---|---|---|
| 2.1 grams HNO₃ followed by 21.3 grams Cl₂ per bbl | 0.92 | 2,710 | 11 | 10 |
| 21.3 grams Cl₂ followed by 2.1 grams HNO₃ per bbl | 0.74 | 2,755 | 12 | 10+ |

It will be seen that an appreciable increase in loaf volume is obtained. Likewise, the improvement in crumb color is significant. It is desired to point out that in the system of scoring used, a difference of one number in either crumb color or grain, is a pronounced difference which is readily recognizable. The indication of a plus value on the crumb grain shows some improvement which is insufficient to warrant a whole number increase in the score. It will be apparent therefore that the improved results of the preferred bleaching sequence are demonstrated not only in flour color but also in the baking properties.

It is evident that the above example is merely illustrative, and that numerous variations can be made in the amounts of gas, partial pressures, time of contact, etc. Seasonal variations in grains, varietal differences, as well as the type of product and the use for which it is intended may require changes in operating conditions. The optimum operating conditions for any given application can readily be determined in the same manner that optimum bleaching conditions are at present determined in conventional bleaching practice.

It is possible by means of this invention to completely eliminate the use of benzoyl peroxide, an expensive reagent at present used quite extensively. Even where it is not desired to completely eliminate benzoyl peroxide the amount thereof may be materially reduced while at the same time smaller quantities of gaseous reagents are required to prepare the flour for the benzoyl peroxide bleach.

While bleaching and maturing have been referred to as more or less independent, these results are not always separate and distinct. Depending on the reagent used, the result obtained may be either solely bleaching or bleaching and maturing. Accordingly, in the appended claims the term "bleaching" is intended to have the usual meaning in the milling industry, namely color removal with or without accompanying improvement of the baking properties.

Although the invention has been specifically described with reference to flour, it is to be understood that the invention is also applicable to other grain products whether from wheat or other grains, all of which are included in the term "finely divided milled cereal products" as used in the appended claims.

We claim as our invention:

1. A process of bleaching finely divided milled cereal products which comprises contacting the product, while agitated in a finely divided state, with gaseous chlorine to partially bleach the product and thereafter contacting the partially bleached product, while agitated in a finely divided state, with gaseous nitric acid to bleach said product further.

2. A process of bleaching flour which comprises contacting the flour, while agitated in a finely divided state, with gaseous chlorine to partially bleach the flour and thereafter contacting the partially bleached flour, while agitated in a finely divided state, with gaseous nitric acid to bleach the product further.

3. A process of bleaching flour products and other finely divided milled cereal products which comprises contacting said product, while agitated in a finely divided state, with gaseous chlorine for a time sufficient to bleach said product partially and thereafter contacting the thus partially bleached product, while agitated in a finely divided state, with gaseous nitric acid for a time to bleach said product further.

CHARLES G. FERRARI.
WILLIS S. HUTCHINSON.